United States Patent [19]

Mesinger

[11] Patent Number: 4,664,053

[45] Date of Patent: May 12, 1987

[54] SHEER LINE DECK-EDGE FENDER FOR VESSELS

[76] Inventor: Robert H. Mesinger, 564 SW. Thornhill La., Palm City, Fla. 33490

[21] Appl. No.: 771,788

[22] Filed: Sep. 3, 1985

[51] Int. Cl.$^4$ ............................................. B63B 59/02
[52] U.S. Cl. ..................................... 114/219; 267/139
[58] Field of Search ................ 114/219; 267/139, 140; 405/212, 215; D12/167, 168

[56] References Cited

U.S. PATENT DOCUMENTS

| | | | |
|---|---|---|---|
| 2,543,404 | 2/1951 | Harasty | 114/219 |
| 2,577,236 | 12/1951 | Doherty | 114/219 |
| 3,000,021 | 9/1961 | Lang | 114/219 |
| 3,179,397 | 4/1965 | Cleereman et al. | 267/140 |
| 3,411,304 | 11/1968 | Miller | 405/215 |
| 3,418,815 | 12/1968 | Kumazawa | 405/215 |
| 3,988,997 | 11/1976 | Fenton | 114/219 |

FOREIGN PATENT DOCUMENTS 551153 2/1943 United Kingdom ................ 114/219

Primary Examiner—Trygve M. Blix
Assistant Examiner—Edwin L. Swinehart
Attorney, Agent, or Firm—Mattern, Ware, Stoltz & Fressola

[57] ABSTRACT

A vertically elongated resilient fender for deployment between a floating vessel and a dock or an adjacent floating vessel, defined by a flat rear wall and a convexly arched front wall integrally joined along their peripheral edges, together enclosing a hollow interior chamber, and having lateral wing flanges extending sidewise from the upper side edges of the rear base panel with securing eyes formed therein to receive a securing line employed to anchor the fender with its wing flanges flexibly bent backward behind the rear base panel. When this fender is cleated near the edge of a boat deck, its backwardly bent wing flanges rest on the deck, suspending the fender directly in front of the sheer line deck edge, firmly retaining the fender against dislodgement.

9 Claims, 8 Drawing Figures

U.S. Patent    May 12, 1987    4,664,053
FIG. 1
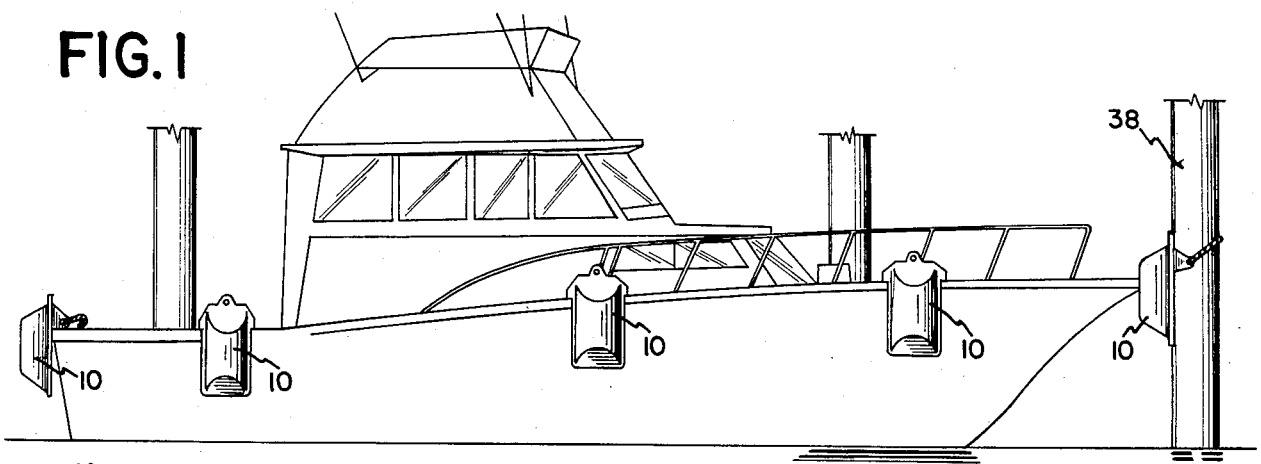
FIG. 2
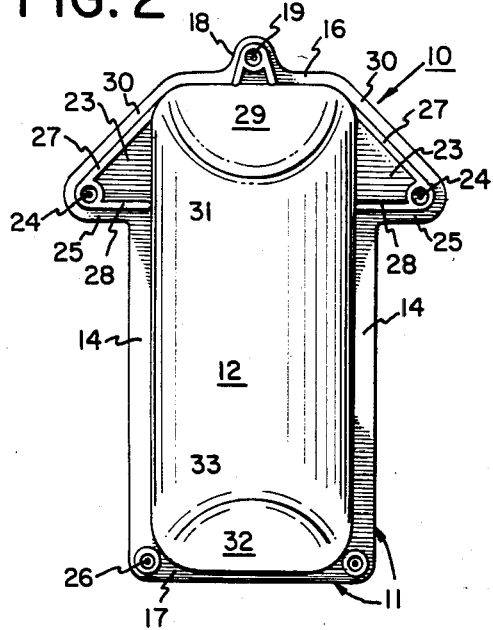
FIG. 3
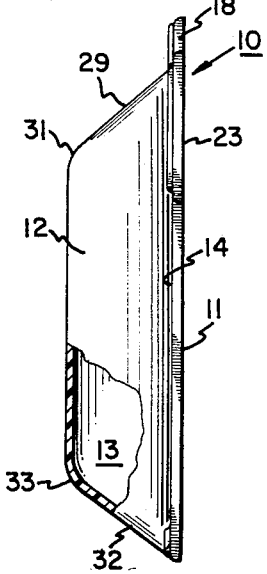
FIG. 4
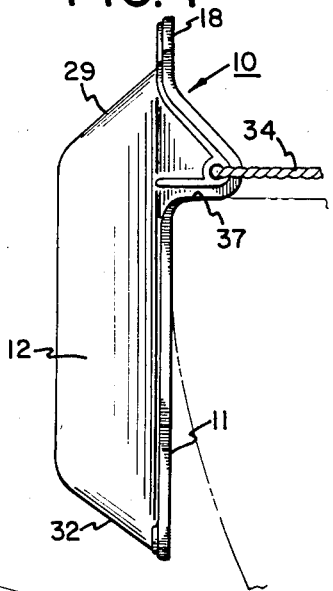
FIG. 5
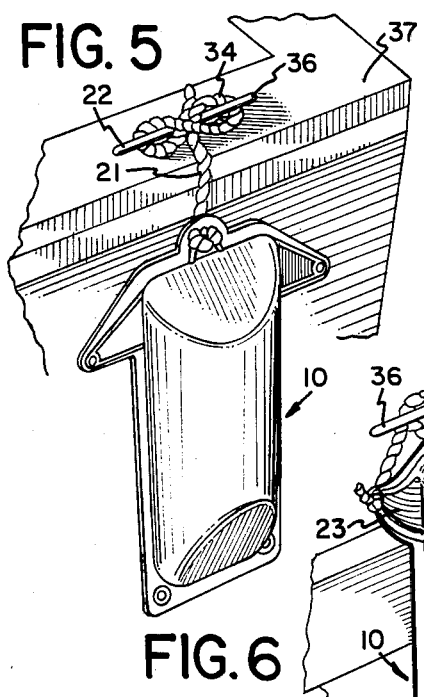
FIG. 6
FIG. 7
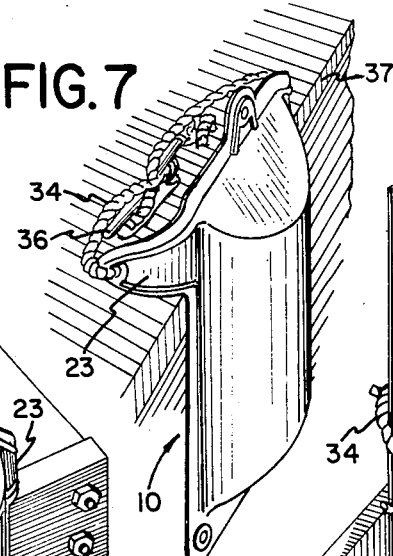
FIG. 8
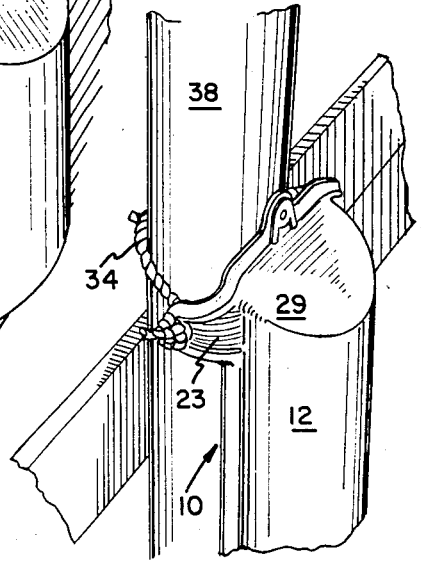

4,664,053

SHEER LINE DECK-EDGE FENDER FOR VESSELS

This invention relates to resilient, compressible fenders deployed or suspended beside the upper "sheer-line" or deck edge of a vessel's topsides, the upper sides of the hull. Abrasion damage, scrapes and impacts with adjacent docks, piers, pilings and vessels are avoided by deploying compressible fenders at each position needed to absorb impact or abrasion forces.

The fenders of this invention are uniquely designed to retain themselves at the desired position, protecting the deck edge of the vessel. They provide a successful solution to a long-standing problem — maintaining the fenders at the desired level, where they will reliably protect the vessel from damage.

TECHNICAL FIELD

Conventional hollow resilient synthetic fenders of cylindrical or spherical shape have now replaced woven or braided fenders of worn out manila rope, hung from stanchions, cleats or lifelines, suspended beside a vessel to protect its sides from impacts.

Such suspended hanging fenders often dangle beneath the deck edge of a vessel and may be compressed between the vessel's topsides and a nearby dock or pilings at a height below the level of the deck or sheer line, failing to protect the deck edge from impact and damage as wind or wave action drives the vessel toward the adjacent structures. With suspended cylindrical or spherical fenders, forward and backward movement of the vessel caused by such forces may roll the fenders upward and eventually displace them above the deck edge, thus disabling the fenders for their intended purpose and leaving the vessel unprotected.

Various other forms of fendering material such as worn out fire hose or extruded tubular flexible synthetic fendering are customarily installed along or below the edge of floating docks or "floats," but the vessel's deck edge is customarily high above the fendered float edge in such cases, and is not protected by such float fendering.

Bulky compressible fendering woven of hemp or assembled with worn rubber tires is often seen installed on the bows of tugboats to minimize or avoid marring the paint of the vessels being pushed by the tugs, but such bulky compressible fendering is unattractive and inappropriate for protecting the deck edges of yachts and ordinary vessels.

The novel fenders of the present invention are uniquely adapted to fill this long-felt need, being constructed for stable fixed deployment, engaged with the edge of the vessel's deck at the sheer line, where they remain without unwanted displacement and without descending below the deck edge during normal use.

The fenders of this invention are preferably resilient hollow fenders of molded synthetic polymers having a flat base panel facing the hull of the vessel, a concave dock-engaging face arching outward from the base panel, enclosed top and bottom ends embracing a central hollow chamber between the base panel and the arched dock-engaging face, and two upper wing flanges protruding laterally from the upper edge of the base panel. The wing flanges, the top portion of the base panel and other parts of the base panel if desired are formed with securing eyes extending therethrough for engaging fender lines securing the fenders of this invention to cleats on the deck edge or to other portions of the vessel such as stanchions, rails, lifelines and the like. The fenders of this invention are also well adapted to be secured to the edges of docks, to pilings and to floats if desired.

Accordingly, a principal object of the present invention is to provide fenders of novel shape, capable of protecting the sheer line deck edges of vessels reliably from damage caused by impacts against adjacent vessels, docks and structures.

Another object of the invention is to provide fenders of this character, shaped for stable deployment on the vessel's deck edge, with provisions for resisting displacement from these deployed positions enhancing their capability for providing reliable protection for the vessel to cushion it from damaging impacts against adjacent vessels, docks or structures.

Still another object to the invention is to provide such fenders of unitary hollow molded construction, capable of high volume manufacture in hollow cavity rotational molds.

Other objects of the invention will in part be obvious and will in part appear hereinafter.

The invention accordingly comprises the features of construction, combinations of elements, and arrangements of parts which will be exemplified in the constructions hereinafter set forth, and the scope of the invention will be indicated in the claims.

The invention accordingly comprises an article of manufacture possessing the features, properties, and the relations of elements which will be exemplified in the articles hereinafter described, and the scope of the invention will be indicated in the claims.

For a fuller understanding of the nature and objects of the invention, reference should be had to the following detailed description taken in connection with the accompanying drawings, in which:

BREIF DESCRIPTION OF THE DRAWINGS

FIG. 1 is a side elevation view of a power cruiser equipped with three fenders of the present invention deployed along the edge of its deck, and one such fender deployed at the top of its transom at the stern, with a fifth fender of the present invention being shown secured to a piling at the bow of the vessel.

FIG. 2 is a front elevation view of a preferred embodiment of the fender of the present invention.

FIG. 3 is a side elevation view, partially broken away, of the same embodiment of the invention, shown in its normal, unstressed condition.

FIG. 4 is a corresponding side elevation view of the same device deployed at the edge of a vessel's deck with its wing flanges flexibly bent backward over the deck edge.

FIGS. 5, 6, 7 and 8 are perspective diagrammatic views showing the preferred form of a fender of the present invention deployed in various ways on decks, docks and a piling.

BEST MODE OF CARRYING OUT THE INVENTION

As shown in the drawings, the fender 10 shown in FIGS. 2, 3 and 4, and illustrated in its various deployed positions in the other figures, is not formed in the cylindrical shape of a conventional suspended fender. Instead the fender 10 is provided with a substantially flat deck edge-engaging base wall 11, having a generally rectangular configuration, as shown by its outline in FIG. 2. Arching forwardly in a semi-cylindrical configuration is a concavely arched front wall 12 integrally joined along its side edges to the base wall 11 near the side edges thereof, and having its upper and lower ends curved or beveled as shown in the figures to join base wall 11 near its respective upper and lower ends. Arched front wall 12 preferably encloses with base wall 11 a hollow interior chamber 13, shown in FIG. 3. Compressible foam material may fill chamber 13, if desired.

Preferably the outer edge of the base wall 11 extends laterally beyond arched front wall 12 forming the side rim 14 along each side of the device. Correspondingly the upper and lower ends of base wall 11 also extend beyond the front wall 12, forming an upwardly extending top rim 16 and a downwardly extending bottom rim 17 respectively. Further extending upward from top rim 16 is an anchoring flange 18 having an eye 19 formed therein through which a fender line 21 may be passed to secure the fender 10 to a cleat 22, as shown in FIG. 5.

Extending laterally outward from each of the side rims 14 at their upper ends near top rim 16 is a lateral wing flange 23 lying substantially in the plane of base wall 11, as indicated in FIGS. 2 and 3. Preferably, as indicated in FIG. 2, each wing flange 23 is formed in the shape of a triangle having a substantially horizontal lower edge 25 and a downwardly slanting diagonal upper edge 30 meeting at an outer apex incorporating a deploying eye 24 similar to anchoring eye 19.

If desired, as shown in FIG. 2, each lower corner of the fender 10, formed by the junction of each side rim 14 with the bottom rim 17, may incorporate a similar corner eye 26 useful in some cases for securing the fender 10 in deployed position. In the preferred form of the device, a stiffening rib 27 extends along the diagonal slanting upper edge 30 of wing flange 23, set back from its edge and a similar stiffening rib 28 is formed along the lower substantially horizontal edge 25 of wing flange 23, similarly set back from its edge and terminating in a boss encircling deploying eye 24. A similar boss is preferably also formed around anchoring eye 19 and each corner eye 26.

The hollow internal chamber 13 best shown in FIG. 3 is preferably sealed to enclose a bubble of air during the molding process, but a truly airtight seal is not essential. The pillow shape of the hollow molded fender 10 contributes substantially to its compressible impact-resisting performance. An upper slanting beveled face 29 of the device extends downward from upper rim 16 into smoothly curved integral blending with the arched front wall 12 along the upper rim line 31, and a similarly upward sloping beveled lower face 32 extends upward and forward from lower rim 17 into similar smoothly curved blending with the lower portion of the arched front wall 12 along the lower rim line 33.

The outwardly arched convex front wall 12, reinforced by these beveled upper and lower walls 29 and 32, thus forms a resiliently compressible pillow shape having a flat hull-engaging base or rear face 11. The outer walls 12, 29 and 32 are free to depress and flex toward base wall 11 under impacts and forces applied by the pressure of the vessel moving against adjacent vessels, docks or piers, and flexing inward deformation of these surfaces in the direction of base wall 11 is resisted not only by their own resilience but also by the resulting compression of the air in chamber 13, thus providing an air-filled compressible cushion tending to resist and counteract shock loads, forming a highly effective protective barrier for the vessel itself.

Beveled top and bottom walls 29 and 32 may be formed with slight curvature if desired, preferably in a convexly outward direction. Preferably all corners and edges of the fender 10 such as rim lines 31 and 33 and also if desired the edges of rims 14, 16, 17 and 18 and the bosses surrounding the eyes 19, 24 and 26 are all smoothly rounded and curved to avoid sharp edges which might mar the face of the protected vessel or other adjacent vessels against which fender 10 comes in contact.

While wing flanges 23 are molded substantially in the plane of base wall 11, co-planar with the substantially flat vessel engaging rear face of fender 10, as shown in FIG. 3, the flexibility of these wing flanges 23 assures sturdy, stable mounting deployment for fender 10 directly where it is needed at the sheer line or deck edge of the vessel, as shown in FIG. 1. FIGS. 4, 6 and 7 illustrate this preferred mounting of fender 10 on the deck edge with a deploying line 34 secured in each deploying eye 24 and sturdily cleated on a cleat 36 near the deck edge 37 of the vessel on which fender 10 is mounted, or the adjoining dock.

As illustrated in FIGS. 4, 6 and 7, when fender 10 is mounted on the deck edge, its wing flanges 23 are flexibly arched rearwardly away from the concave front wall 12 of fender 10, past base wall 11 in the rearward direction over the deck edge 37 toward cleat 36. In this arched position the lower substantially horizontal edge 25 of each wing flange 23 protrudes over the edge 37 and rests thereon, cooperating with deploying line 34 to block downward movement of fender 10 below the deck edge Thus, as shown in FIG. 1, all fenders 10 are preferably secured in this deployed position with their wing flanges arched over the deck edge to position them firmly and immovably along the protected deck edge 37. In this mode of deployment, the fender 10 is unable to descend to the conventional suspended position shown in FIG. 5, for example, in which the deck edge would be left unprotected. By this means, the unique fenders 10 of the present invention, effectively avoid the problem encountered with conventional suspended fenders, dangling below the deck edge somewhere beside the topsides of the vessel but failing to cushion the deck edge itself against impacts.

The flat vessel-engaging face 11 of fender 10 and the wing flanges 23 also prevent rolling of the fender upon relative longitudinal motion of dock and vessel, and fenders 10 are retained in their deployed position, and do not roll up and out from between dock and vessel, even when it is suspended below the deck edge as shown in FIG. 5.

Flexible wing flanges 23 are also well adapted for firmly secured deployment of fender 10 on the face of a piling 38, as shown in FIGS. 1 and 8, where deploying line 34 is tightly secured around the piling arching wing flanges 23 rearwardly past base wall 11 toward and around the piling, embracing its surface and serving to minimize or eliminate migration of fender 10 downward or around the face of piling 38. Fender 10 thus retains itself in it intended position, presented to cushion the impact of the vessel.

It will thus be seen that the objects set forth above, and those made apparent from the preceding description, are efficiently attained and, since certain changes may be made in the above constructions without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

What is claimed is:

1. A vertically elongated portable resilient fender for suspended deployment between a dock and and adjacent floating vessel, defined by a substantially flat rear base wall having an upper edge, a lower edge and elongated substantially vertical side edges, a forwardly convexly arched front wall having a rim integrally joined around its periphery to the base wall near its periphery, a pair of flexible wing flanges respectively extending in opposite lateral directions from the upper part of each elongated vertical side edge of the substantially flat rear base wall, forming therewith a flat flexible T-shaped base wall whose laterally extending flexible upper wing flange portions may both be bent rearwardly for interfering engagement in the manner of rearwardly projecting elbows overlying the outer edge of a deck or dock, and means forming a deployment eye in each wing flange, whereby a deploying line secured in each wing flange eye can be secured to a supporting structure, thereby suspending the fender with its wing flanges flexed and bent rearwardly by the depolying line secured thereto.

2. The resilient fender defined in claim 1 wherein the rear base wall is vertically elongated in a substantially rectangular shape.

3. The resilient fender defined in claim 2 wherein the arched front wall is elongated in a generally semi-cylindrical configuration.

4. The resilient fender defined in claim 3 wherein the arched front wall is provided with slanting upper and lower end walls joining the respective upper and lower ends of the rear base wall to intermidiate sections of the generallly semi-cylindrical arched front wall.

5. The resilient fender defined in claim 1 wherein the arched front wall and the rear base wall define therebetween a hollow enclosed interior chamber.

6. The resilient fender defined in claim 2 wherein the wing flanges extend from the upper end of the rear base wall substantially in the plane of the rear base wall.

7. The resilient fender defined in claim 1, further including an anchoring flange extending upward from the upper end of the base wall, with means forming a suspending eye therein.

8. The resilient fender defined in claim 2 wherein the rear base wall extends laterally beyond the arched front wall to form a lateral rim along each elongated side edge of the rear base wall, resisting rolling of the fender.

9. The resilient fender defined in claim 8, further including means forming a corner eye in the lower end of each lateral rim near the lower end of the vertically elongated fender.

* * * * *